US012726329B2

(12) United States Patent
Moon

(10) Patent No.: US 12,726,329 B2
(45) Date of Patent: Sep. 1, 2026

(54) HOMOMORPHIC CRYPTOGRAPHIC SYSTEM INCLUDING NOISE ESTIMATOR AND OPERATION METHOD THEREOF

(71) Applicant: SAMSUNG ELECTRONICS CO., LTD., Suwon-si (KR)

(72) Inventor: Young Sik Moon, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 57 days.

(21) Appl. No.: 18/631,598

(22) Filed: Apr. 10, 2024

(65) Prior Publication Data

US 2025/0088347 A1 Mar. 13, 2025

(30) Foreign Application Priority Data

Sep. 12, 2023 (KR) ........................ 10-2023-0121104

(51) Int. Cl.
*H04L 9/00* (2022.01)
*H04L 9/06* (2006.01)
*H04L 9/08* (2006.01)

(52) U.S. Cl.
CPC ................ *H04L 9/008* (2013.01); *H04L 9/06* (2013.01); *H04L 9/0861* (2013.01)

(58) Field of Classification Search
CPC . H04L 9/0008; H04L 9/06; H04L 9/40; H04L 63/0428; H04L 2209/12; H04L 9/0861
See application file for complete search history.

(56) References Cited

U.S. PATENT DOCUMENTS

| | | | |
|---|---|---|---|
| 8,433,893 B2 | 4/2013 | Sun et al. | |
| 10,554,390 B2 | 2/2020 | Jain et al. | |
| 11,451,370 B2 | 9/2022 | Williams et al. | |
| 11,483,128 B2 | 10/2022 | Moon et al. | |
| 11,750,367 B2 * | 9/2023 | Ahn | H04L 9/008 713/189 |
| 2018/0375640 A1 * | 12/2018 | Laine | H04L 9/008 |
| 2021/0297396 A1 * | 9/2021 | Shattil | H04W 12/08 |
| 2022/0094521 A1 | 3/2022 | Moon et al. | |

(Continued)

FOREIGN PATENT DOCUMENTS

| | | |
|---|---|---|
| CN | 115169589 A | 10/2022 |
| CN | 116127371 A | 5/2023 |

(Continued)

OTHER PUBLICATIONS

"Homomorphic Encryption Standard"—Albrecht et al., Homomorphic Encryption Standard v1.1, Nov. 21, 2018 https://homomorphicencryption.org/wp-content/uploads/2018/11/HomomorphicEncryptionStandardv1.1.pdf (Year: 2018).*

(Continued)

*Primary Examiner* — Randy A Scott
(74) *Attorney, Agent, or Firm* — Fish & Richardson P.C.

(57) ABSTRACT

An operation method of a homomorphic encryption system comprises generating a ciphertext, performing an operation on the ciphertext, generating history information about the operation, generating a noise prediction value by predicting noise accumulated in the ciphertext by the operation based on the history information, and generating an encryption parameter including a guard interval inserted into the ciphertext based on the noise prediction value.

17 Claims, 15 Drawing Sheets

(56) References Cited

U.S. PATENT DOCUMENTS

| | | | |
|---|---|---|---|
| 2023/0028606 | A1 | 1/2023 | Cheng et al. |
| 2023/0078726 | A1 | 3/2023 | Jing |
| 2023/0146149 | A1 | 5/2023 | Moon et al. |

FOREIGN PATENT DOCUMENTS

| | | | | | |
|---|---|---|---|---|---|
| CN | 116865953 | A | * | 10/2023 | ........... H04L 9/0861 |
| EP | 3975471 | | | 4/2023 | |
| KR | 101121086 | B1 | * | 3/2012 | ......... H04L 25/0256 |
| KR | 10-2023-0064893 | | | 5/2023 | |
| WO | WO-2021162743 | A1 | * | 8/2021 | ............... G06N 7/01 |

OTHER PUBLICATIONS

"Noisy Ciphers for Approximate Homomorphic Encryption"—Ha et al., Advances in Cryptology, Eurocrypt 2022, May 25, 2022 https://link.springer.com/chapter/10.1007/978-3-031-06944-4_20 (Year: 2022).*

Extended European Search Report in European Appln. No. 24193311.8, mailed on Jan. 30, 2025, 8 pages.

* cited by examiner

FIG. 4

| OP_HIS | Naprx |
| --- | --- |
| CT×CT | $Log_2L$ |
| CT binary tree multiplication | L |
| CT binary tree addition | $Log_2L$ |
| ⋮ | ⋮ |
| Operation type | estimated bits |

Start
Receive *Naprx* from Server
S110
Select parameter range based on security level and model complexity
S120
Select parameter range according to supportable H/W size
S130
Select optimal parameter according to application model
S140
End

FIG. 8

| Gurard Interval | 40 | | 20 | |
|---|---|---|---|---|
| Utilization | FPGA1 | HE IP | FPGA2 | HE IP |
| LUT(K) | 1,100 | 800 | 800 | 450 |
| FF(K) | 2,500 | 800 | 1,000 | 450 |
| BRAM(MB) | 10 | 9.5 | 4.3 | 4 |
| DSP | 7,000 | 5,000 | 1,900 | 1,800 |

FIG. 9

Parameter mapping table(1225)

| Naprx coverage | | 30<Naprx<40 | 20<Naprx<30 | 10<Naprx<20 |
|---|---|---|---|---|
| PMRT | GI | 40 | 30 | 20 |
| | Polynomia Order | $2^{17}$ | $2^{14}$ | $2^{13}$ |
| | Security | 256 | 128 | 80 |
| | Size of CT | 44 MB | 1.3 MB | 0.393 MB |

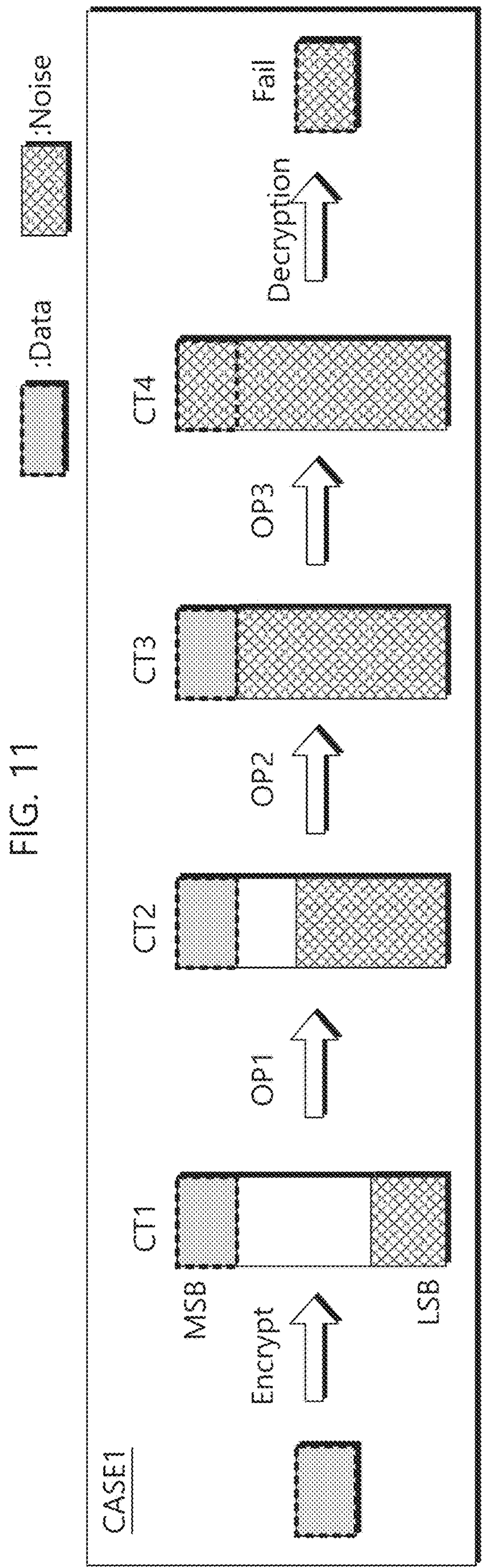
FIG. 11
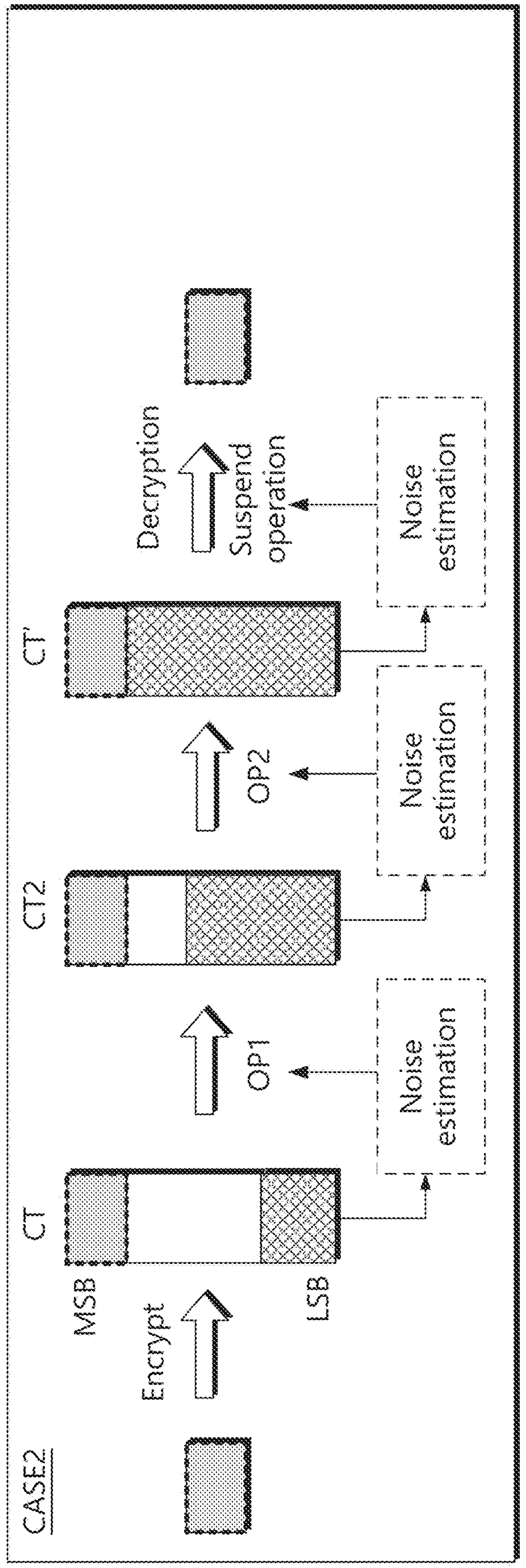

Figure 12:
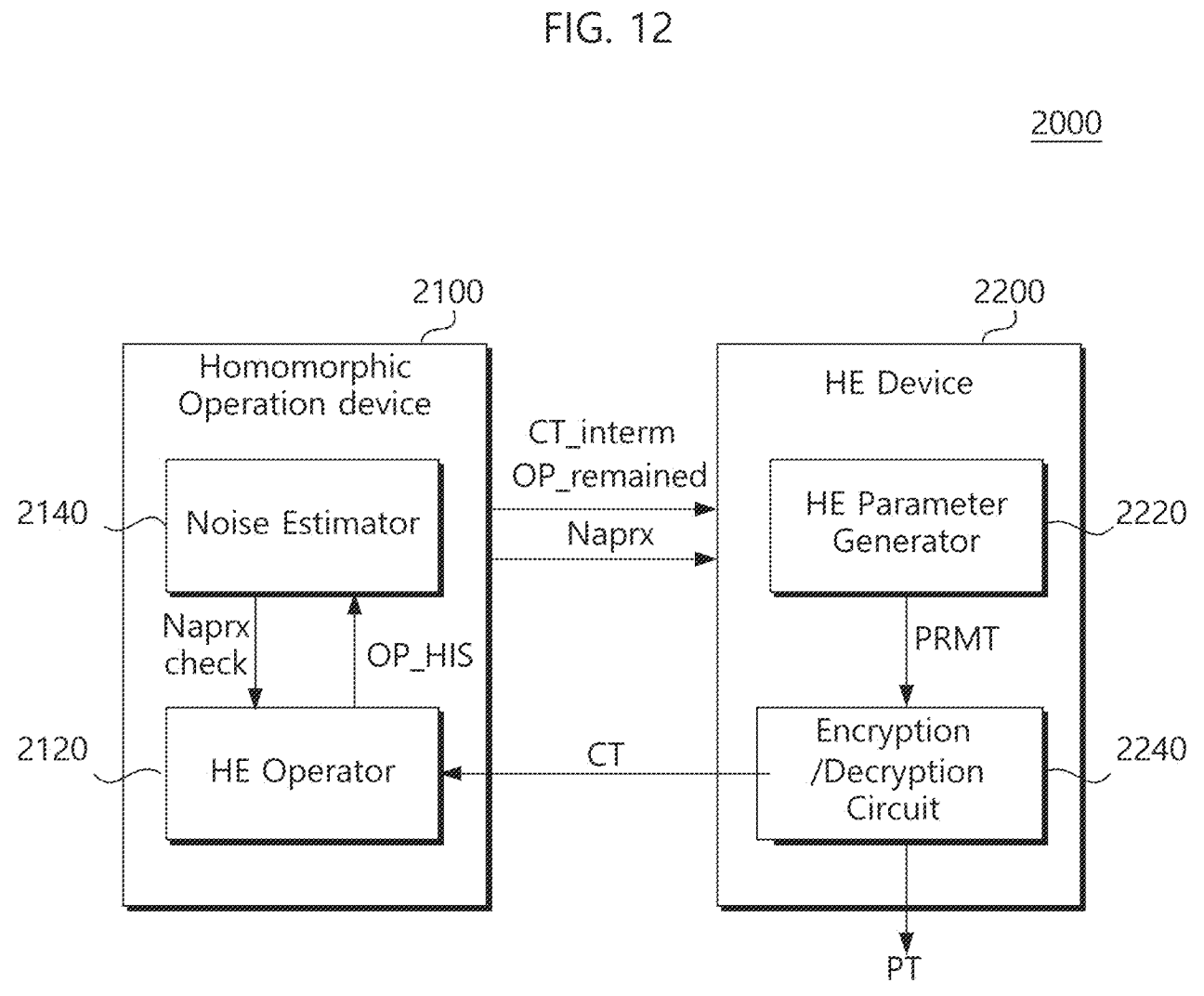

2200
HE Device
2220
HE Parameter Generator
PRMT
2240
Encryption /Decryption Circuit
PT
CT_interm
OP_remained
Naprx
CT
2100
Homomorphic Operation device
2140
Noise Estimator
OP_HIS
Naprx check
2120
HE Operator 3000
3200
User device
3220
HE Parameter Generator
PRMT
3240
Encryption /Decryption Circuit
Naprx
3300
Network
Naprx
3100
Server
3140
Noise Estimator
OP_History
3120
HE Operator

HOMOMORPHIC CRYPTOGRAPHIC SYSTEM INCLUDING NOISE ESTIMATOR AND OPERATION METHOD THEREOF

CROSS-REFERENCE TO RELATED APPLICATIONS

This application claims priority to Korean Patent Application No. 10-2023-0121104, filed in the Korean Intellectual Property Office on Sep. 12, 2023, the disclosure of which are incorporated by reference herein in its entirety.

BACKGROUND

To protect information, cryptography technology is used to encrypt messages. With the development of communications and the widespread use of mobile devices, the demand for security for personal information is increasing. To protect personal information, messages are generally encrypted and transmitted or stored using a secret key. However, along with the development of encryption technology, security attack technology is also developing. Security attackers are trying various techniques to hack private keys. Accordingly, concerns over the occurrence of security incidents due to negligent delivery or management of secret keys are increasing.

Even if the homomorphic encryption operates on the ciphertext without decrypting the encrypted information, it can provide the same result as the encrypted value after operating on the plaintext. When using homomorphic encryption, various operations, such as statistical processing and machine learning, can be performed without decrypting the ciphertext. The advantage of using homomorphic encryption is that the chance of exposing the secret key is relatively small. Accordingly, homomorphic encryption is a core technology that companies providing big data-based services pay attention to.

In order to encrypt original data in homomorphic encryption, encryption parameters must first be set. The computational ability of homomorphic encryption, which can perform operations in an encrypted state, is determined by the encryption parameters. When configuring an application system using homomorphic encryption, what operations the application system must support and what bit precision the operation result can support are determined by encryption parameters. Generally, in an application system where operation information is determined in advance, homomorphic encryption parameters are found and ciphertext is generated. However, transferring pre-determined operation information from the server to the user device is not an easy problem. Because the server's operation information (e.g., machine learning hierarchy, weights/bias, model information) is a corporate secret, it is difficult to disclose it. In addition, in the case of applications with a variable operation structure where the number of operations cannot be determined in advance, such as iteration operations, operation information cannot be confirmed. Accordingly, the method of generating homomorphic encryption parameters with only predetermined operation information may not support the application system or may cause efficiency problems.

SUMMARY

In general, in some aspects, the present disclosure is directed toward a homomorphic encryption system that includes a noise predictor that can configure a homomorphic encryption system without knowing the server's operation information and an operation method thereof.

According to some aspects of the present disclosure, an operation method of the homomorphic encryption system comprises generating a ciphertext, performing an operation on the ciphertext, generating history information about the operation, generating a noise prediction value by predicting noise accumulated in the ciphertext by the operation based on the history information, and generating an encryption parameter including a guard interval inserted into the ciphertext based on the noise prediction value.

According to some aspects of the present disclosure, a homomorphic encryption system comprises a server configured to perform an operation on a first ciphertext and generates a noise prediction value by estimating noise accumulated in the first ciphertext by the operation, and a user device configured to determine a size of a guard interval added when generating a second ciphertext using the noise prediction value.

According to some aspects of the present disclosure, an operation method of the homomorphic encryption system comprises performing, by a server, an operation on a ciphertext, generating, by the server, history information about the operation, generating, by the server, a noise prediction value by predicting noise accumulated in the ciphertext by the operation based on the history information, transmitting, by the server, the noise prediction value to a user device, and generating, by the user device, encryption parameters used for encryption based on the noise prediction value.

BRIEF DESCRIPTION OF THE FIGURES

Exemplary implementations will be more clearly understood from following detailed description, taken in conjunctions with the accompanying drawings.

FIG. 4 is a table illustrating an example of a method of generating a noise prediction value according to the type of homomorphic encryption operation according to some implementations.

FIG. 8 is a table illustrating an example of an upper limit size of the guard interval GI according to the functional block IP size of a homomorphic encryption device according to some implementations.

FIG. 9 shows an example of a parameter mapping table that generates various encryption parameters according to the range of the noise prediction value based on FIG. 7 and FIG. 8 according to some implementations.

FIG. 11 is a diagram showing examples of effects in a system using the noise prediction value according to some implementations.

FIG. 12 is a block diagram showing an example of a homomorphic encryption system according to some implementations.

DETAILED DESCRIPTION

Hereinafter, exemplary implementations will be in detail with reference to the accompanying drawings. Wherever possible, the same reference numbers are used in the description and drawings to refer to the same or like parts.

Figure 1:
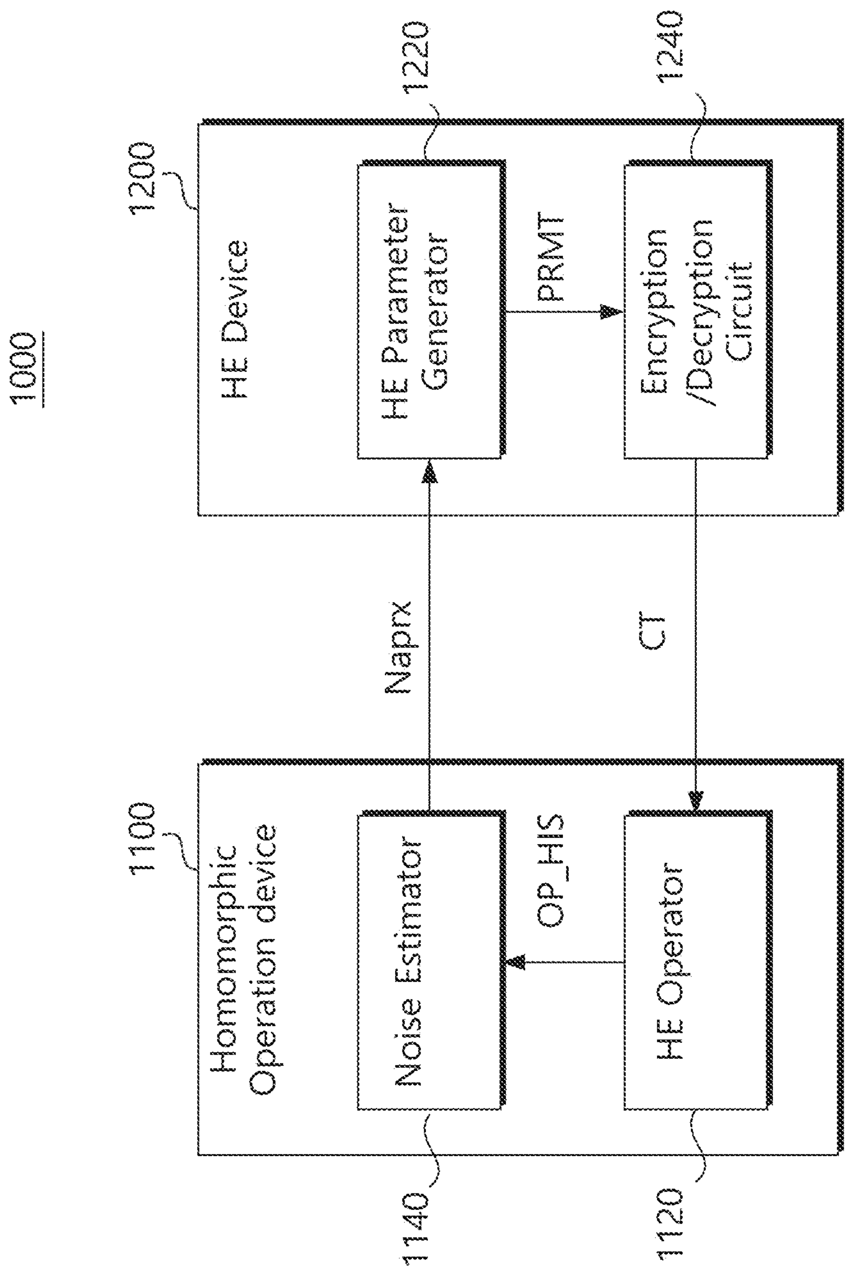
FIG. 1 is a block diagram showing an example of a homomorphic encryption system according to some implementations.

FIG. 1 is a block diagram showing an example of a homomorphic encryption system according to some implementations. In FIG. 1, the homomorphic encryption system 1000 may include a homomorphic encryption operation device 1100 and a homomorphic encryption device 1200.

In some implementations, the homomorphic encryption operation device 1100 performs operations on ciphertexts CT transmitted from the homomorphic encryption device 1200. For example, the homomorphic encryption operation device 1100 may be a server. Servers can provide cloud services or ultra-low latency services using distributed computing or mobile edge computing. In particular, the server may be an intelligent server that uses machine learning or neural networks.

The homomorphic encryption operation device 1100 performs an operation on the ciphertext CT transmitted from the homomorphic encryption device 1200. Noise is inserted into the ciphertext CT of homomorphic encryption for security purposes. As calculations are performed, noise increases in the data. If noise increases more than appropriate as the number of operations increases, decoding may become impossible. Accordingly, a guard interval (hereinafter GI) is inserted into the ciphertext CT of the homomorphic encryption when generating the ciphertext to prevent noise from affecting the original data due to operations between ciphertexts. The size of the guard interval GI is determined by the encryption parameters of the homomorphic encryption system 1000. The encryption parameters are determined by the operation information of the homomorphic encryption operation device 1100. The computation information may be, for example, a machine learning layer structure, weight/bias, and computation flow information used in the homomorphic encryption computation device 1100. However, operation information may be an asset of a company, and if the number of calculations is variable, it is difficult to provide a fixed value. Accordingly, it is difficult to generate ciphertext using an appropriate guard interval GI in the homomorphic encryption device 1200 without operation information.

The homomorphic encryption operation device 1100 can provide a noise prediction value Naprx so that the homomorphic encryption device 1200 can set an appropriate guard interval GI and perform encryption/decryption without transmitting operation information. Accordingly, the homomorphic encryption operation device 1100 includes a homomorphic cryptographic operator 1120 and a noise predictor 1140. The homomorphic encryption operator 1120 performs various operations on the ciphertext CT provided by the homomorphic encryption device 1200. Whenever each operation occurs, the homomorphic encryption operator 1120 generates history information OP_HIS. History information OP_HIS can be added and updated in the form of a tag to the ciphertext CT generated as a result of the operation.

The noise predictor 1140 predicts the noise accumulated by the operation of the ciphertext from the history information OP_HIS provided by the homomorphic encryption operator 1120. Based on the noise prediction value Naprx, the noise predictor 1140 transmits the ciphertext CT and the noise prediction value Naprx to the homomorphic encryption device 1200.

In some implementations, the homomorphic encryption device 1200 converts plaintext into ciphertext or converts ciphertext into plaintext using a homomorphic encryption algorithm, in which the homomorphic encryption device 1200 may be a user device. For example, a user device can be a variety of electronic devices, and may include a storage device, a portable communication device (e.g., a smartphone), a computer device, a portable multimedia device, a portable medical device, a camera, a wearable device, or a home appliance device.

In particular, the homomorphic encryption device 1200 of the present invention can obtain a guard interval GI for encryption even without operation information from the homomorphic encryption operation device 1100. The homomorphic encryption device 1200 generates an encryption parameter PRMT from the noise prediction value Naprx provided from the homomorphic encryption operation device 1100. Additionally, the homomorphic encryption device 1200 can obtain the optimal guard interval GI using the encryption parameter PRMT and generate ciphertext. Accordingly, the homomorphic encryption device 1200 may include a homomorphic encryption parameter generator 1220 and an encryption/decryption circuit 1240.

In some implementations, the homomorphic encryption parameter generator 1220 may obtain a guard interval GI that satisfies at least one condition from the noise prediction value Naprx provided from the homomorphic encryption operation device 1100. For example, the conditions may include constraints that meet the security level of the homomorphic encryption standard, the size or capability of the functional block (e.g., IP) of the homomorphic encryption device 1200, or application model requirements. The homomorphic encryption parameter generator 1220 can construct a parameter mapping table from the noise prediction value Naprx and provide a guard interval GI at high speed.

In some implementations, the encryption/decryption circuit 1240 uses parameters (e.g., guard interval) provided from the homomorphic encryption parameter generator 1220 for encryption and decryption operations. For example, the encryption/decryption circuit 1240 may generate ciphertext using an optimized guard interval GI provided from the homomorphic encryption parameter generator 1220 during encryption. In this case, the optimal guard interval GI for encryption can be generated without operation information of the homomorphic encryption operator 1100 corresponding to the server. Accordingly, encryption or decryption using encryption parameters, such as guard interval GI, optimized for the homomorphic encryption system 1000 is possible.

In some implementations, the homomorphic encryption system 1000 can obtain optimal parameters applied to encryption by using the noise prediction value Naprx generated from the noise predictor 1140 instead of operation information. For example, the size of the optimal guard interval GI used for encryption of homomorphic encryption can be generated from the noise prediction value Naprx. Accordingly, the optimal guard interval GI required for encryption can be easily generated without the server's operation information.

Figure 2:
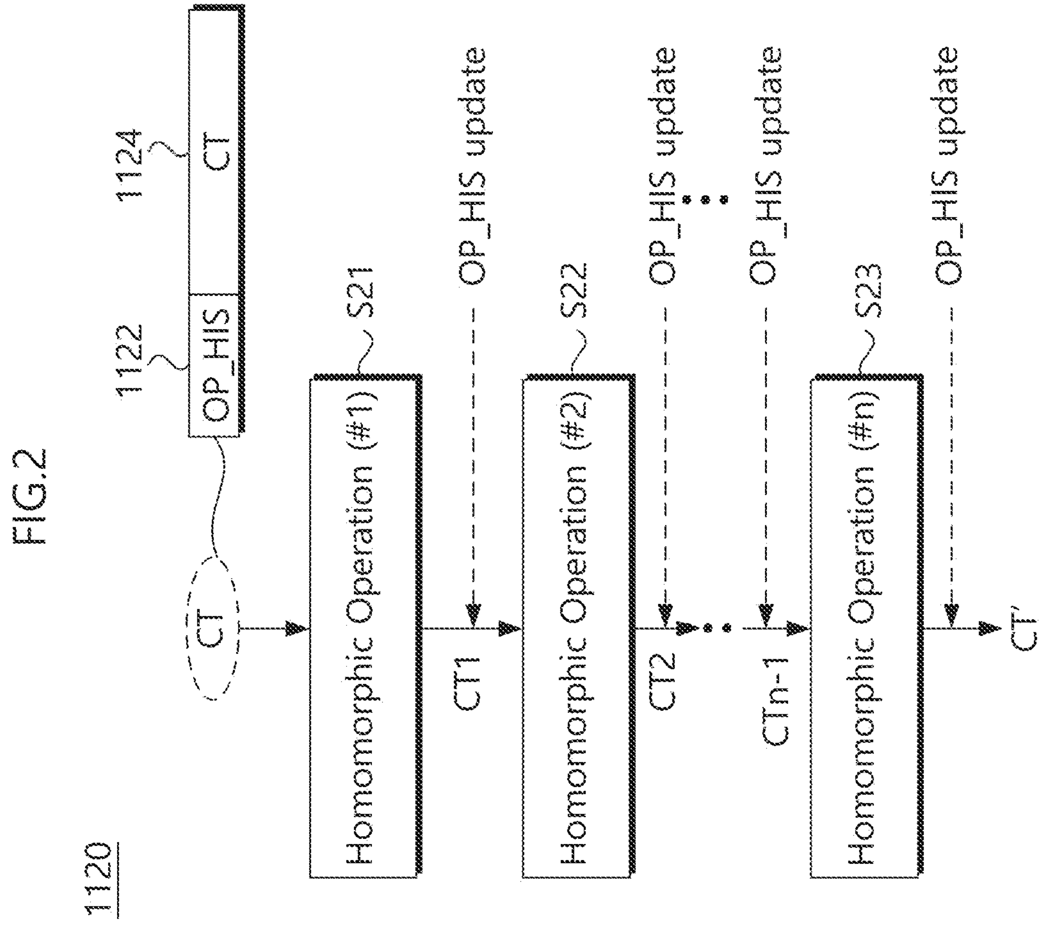
FIG. 2 is a diagram illustrating an example of an operation method of the homomorphic encryption operator of FIG. 1 according to some implementations.

FIG. 2 is a diagram illustrating an example of an operation method of the homomorphic encryption operator of FIG. 1. In FIG. 2, the homomorphic encryption operator 1120 performs a plurality of homomorphic encryption operations on the ciphertext CT. Accordingly, history information OP_HIS including the type or number of operations on the ciphertext CT may be generated.

The homomorphic encryption operator 1120 may tag the ciphertext CT received from the homomorphic encryption device 1200 with history information OP_HIS. For example, the history information (OP_HIS, 1122) can be treated like the tag information of the ciphertext (CT, 1124). In addition, history information OP_HIS may be tagged as an initialization value in the first ciphertext CT before the operation by the homomorphic encryption operator 1120 occurs. When an operation is applied to the ciphertext CT by the homomorphic encryption operator 1120, the history information OP_HIS is updated to a value including the corresponding operation characteristics.

For example, when the first homomorphic encryption operation (#1) is executed in step S21, the homomorphic encryption operator 1120 will generate the ciphertext CT1 as a result of the operation. Accordingly, the homomorphic encryption operator 1120 will update the history information OP_HIS including the characteristics of the first homomorphic encryption operation (#1) in the ciphertext CT1. Similarly, when the second homomorphic encryption operation (#2) is executed in step S22, the homomorphic encryption operator 1120 will generate the ciphertext CT2 after performing the operation on the ciphertext CT1. Accordingly, the homomorphic encryption operator 1120 will additionally update the ciphertext CT2 with history information OP_HIS including the characteristics of the second homomorphic encryption operation (#2). When the nth homomorphic encryption operation (#n), which is finally executed in this way, completes step S23, the homomorphic encryption operator 1120 performs an operation on the ciphertext CTn-1 and then generates the final ciphertext CT'. In addition, the homomorphic encryption operator 1120 will update the history information OP_HIS including the characteristics of the nth homomorphic encryption operation (#n) in the final ciphertext CT'.

In some implementations, the history information OP_HIS may include information, such as the number of multiplications or additions between ciphertext and ciphertext, and the number of multiplications or additions between ciphertext and plaintext. For example, the history information OP_HIS may include information about the types and number of various operations applied to the ciphertext. As the operation is repeated, the number of multiplications or additions recorded in the history information OP_HIS may be updated in an accumulated form.

In the above, the generation and update procedures of history information OP_HIS performed in the homomorphic encryption operator 1120 have been described as an example. The homomorphic encryption operator 1120 may provide the noise predictor 1140 with history information OP_HIS including operation information accumulated as operations occur.

Figure 3:
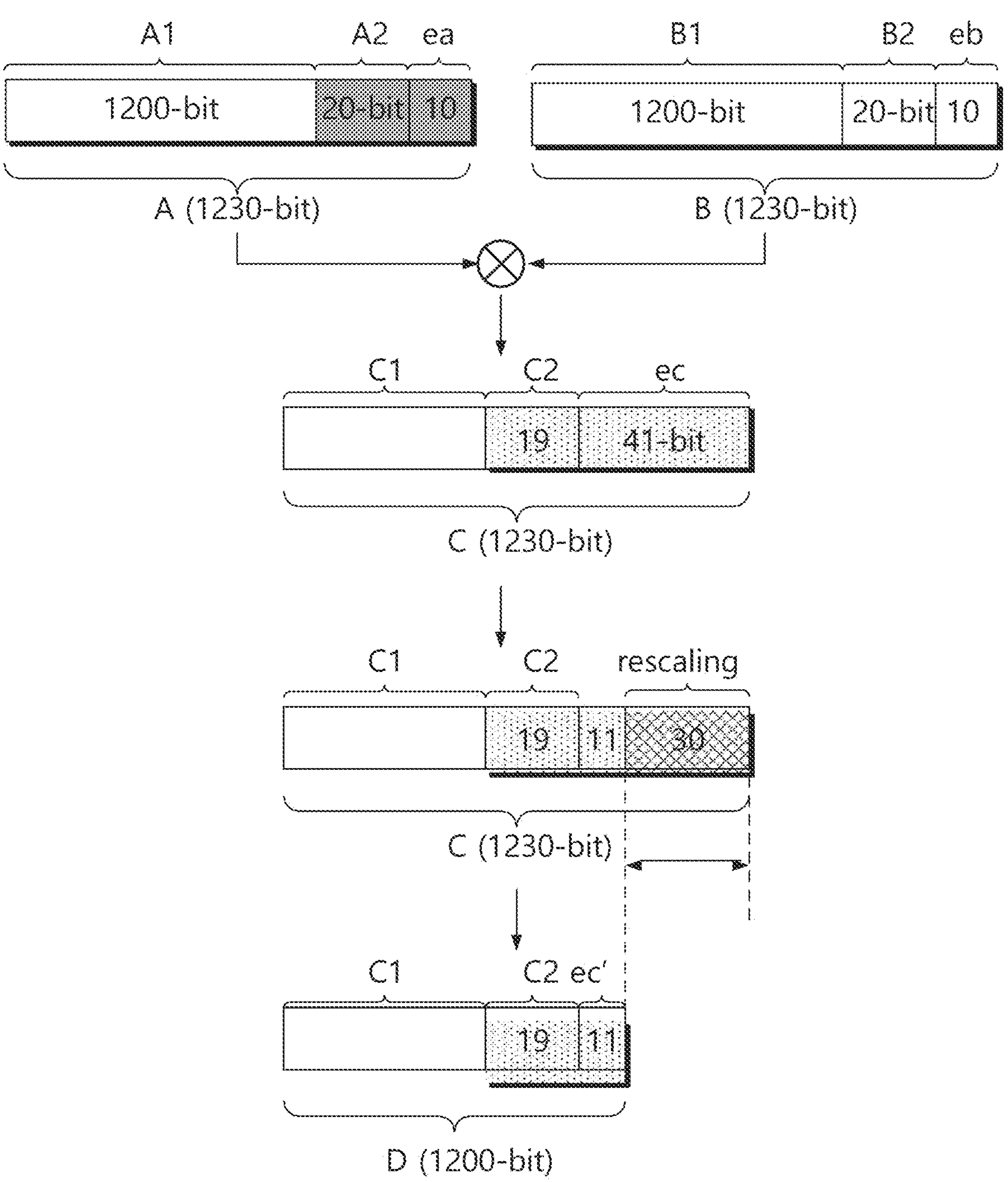
FIG. 3 is a diagram illustrating an example of a ciphertext multiplication method used in homomorphic encryption according to some implementations.

FIG. 3 is a diagram illustrating an example of a multiplication method between ciphertexts used in homomorphic encryption according to some implementations. In FIG. 3, the multiplication process for 1230-bit ciphertexts (A, B) is briefly shown.

It is assumed that the ciphertext A consists of a 1200-bit guard interval A1, 20-bit data bits A2, and 10-bit error bits ca. Likewise, it is assumed that the ciphertext B consists of a 1200-bit guard interval B1, 20-bit data bits B2, and 10-bit error bits eb. As a result of the multiplication operation of the ciphertexts A and B, a new ciphertext C is output. However, the ciphertext C generated as a result of the multiplication has 19-bit data bits C2 and 41-bit error bits ec increased by the multiplication.

In homomorphic encryption, which encrypts a message by adding error bits, the number of error bits increases exponentially as the multiplication operation on the ciphertext is repeated. Accordingly, there is a limit to the number of multiplication operations in homomorphic encryption. In homomorphic encryption, rescaling is a technology that removes errors caused by calculations so that errors caused by ciphertext calculations do not increase exponentially. For rescaling, an optimal guard interval GI must be inserted. Insertion of these guard intervals is applied when generating ciphertext.

In operations, rescaling can be easily performed through shift operations. By rescaling, the error bit ec' is reduced to 11-bit. As a result, the plaintext (C2 and ec') maintains 30 bits.

In the process of calculating the above-described homomorphic encryption, rescaling must be performed to remove errors generated by the calculation so that noise or errors caused by the calculation do not increase exponentially. However, in order to protect the message portion even during rescaling, the size of the noise (or error) in each operation must be recognized. However, as explained above, this operation information is difficult to disclose. Accordingly, when an operation occurs, history information OP_HIS is updated, and noise information accumulated by the operation can be predicted through the updated history information OP_HIS. the noise prediction value Naprx may be provided to the user device or the homomorphic encryption device 1200 in place of the operation information.

FIG. 4 is a table illustrating an example of a method of generating a noise prediction value according to the type of homomorphic encryption operation according to some implementations. In FIG. 4, the noise predictor 1140 (see FIG. 1) may generate a noise prediction value Naprx corresponding to the type of operation recorded in the history information OP_HIS.

First, the types of operations described in the history information OP_HIS may include, for example, multiplication between ciphertexts, binary tree multiplication of ciphertexts, and binary tree addition of ciphertexts. In addition, it will be well understood that the types of operations may further include various ciphertext operations.

If the type of ciphertext operation indicated in the history information OP_HIS is a multiplication operation between ciphertexts, the noise predictor 1140 may determine the noise prediction value Naprx as '$\log_2$ L'. Here, 'L' refers to the number of multiplications used for ciphertext multiplication. If the type of ciphertext operation indicated in the history information OP_HIS is binary tree multiplication of the ciphertext, the noise predictor 1140 may determine the noise prediction value Naprx to be 'L'. Here, 'L' refers to the number of multiplications used in binary tree multiplication. If the type of ciphertext operation indicated in the history information OP_HIS is binary tree addition of the ciphertext, the noise predictor 1140 may determine the noise prediction value Naprx as '$\log_2$ L'. Here, 'L' refers to the number of multiplications used in binary tree addition.

In this way, the noise predictor 1140 (see FIG. 1) can manage the noise prediction value Naprx corresponding to the various types of operations recorded in the history information OP_HIS in a table form.

Figure 5:
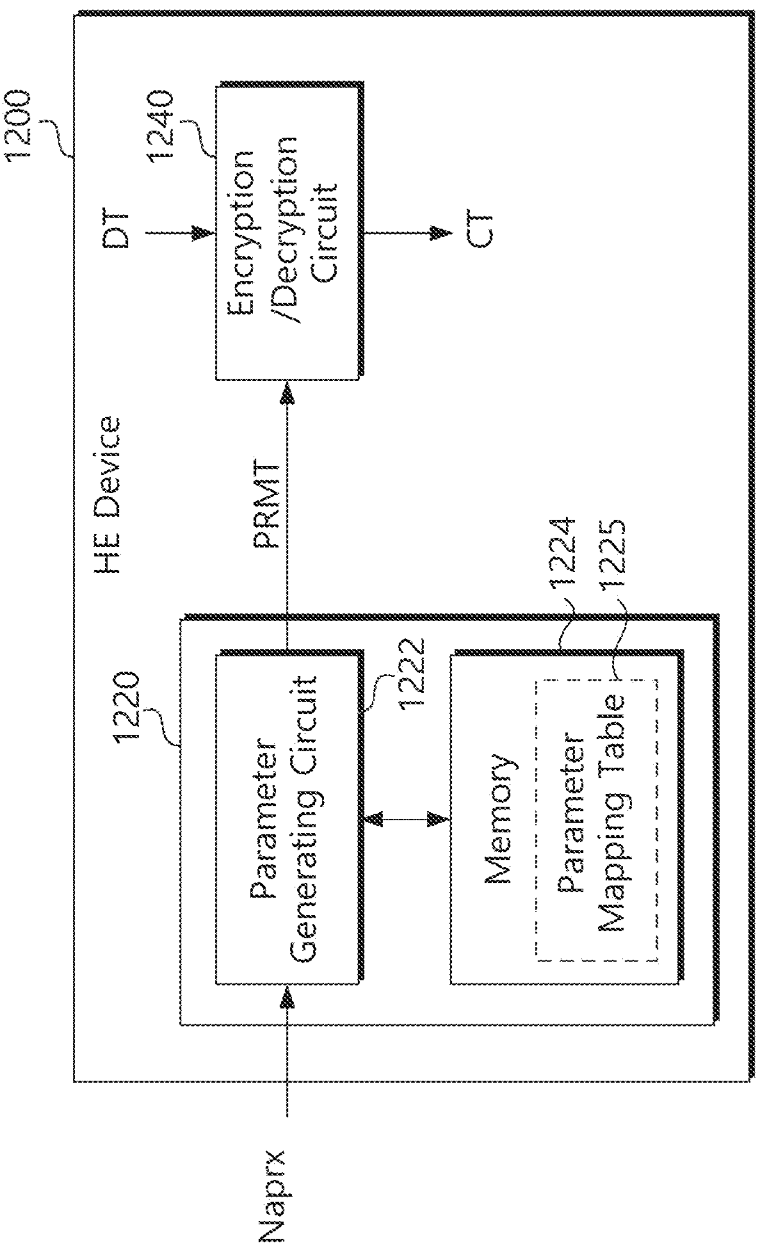
FIG. 5 shows a configuration of the homomorphic encryption device shown in FIG. 1 according to some implementations.

FIG. 5 shows an example of a configuration of the homomorphic encryption device shown in FIG. 1 according to some implementations. In FIG. 5, a homomorphic encryption device 1200 that can be implemented in a user device may include a homomorphic encryption parameter generator 1220 and an encryption/decryption circuit 1240.

The homomorphic encryption parameter generator 1220 may include a parameter generation circuit 1222 and a memory 1224. The parameter generation circuit 1222 receives the noise prediction value Naprx provided from the noise predictor 1140. The parameter generation circuit 1222 stores the received noise prediction value Naprx in the memory 1224. Accordingly, the parameter generation circuit 1222 may generate the parameter mapping table 1225 with reference to the noise prediction value Naprx and the constraints of the homomorphic encryption system 1000. Constraints of the homomorphic encryption system 1000 include, for example, the security level of the homomorphic encryption system 1000, the guard interval GI size that can be supported by the homomorphic encryption function block (e.g., IP), and guard interval GI required for running the application model (e.g., machine learning).

The memory 1224 stores the parameter mapping table 1225 generated by the parameter generation circuit 1222. Parameter values stored in the parameter mapping table 1225 may be updated periodically or when necessary by the parameter generation circuit 1222.

The encryption/decryption circuit 1240 may encrypt or decrypt the data DT using the encryption parameter PRMT provided by the homomorphic encryption parameter generator 1220.

The encryption/decryption circuit 1240 can receive data DT from the outside and generate ciphertext CT by homomorphically encrypting the data DT according to the encryption parameters PRMT provided from the parameter generation circuit 1222. For example, the encryption/decryption circuit 1240 can generate a ciphertext CT that satisfies the encryption parameters PRMT including the total length of the ciphertext, guard interval GI size, message length, or error length.

In addition, the encryption/decryption circuit 1240 may receive the final ciphertext CT' generated through calculation from the homomorphic encryption operation device 1100, decrypt it, and output the decrypted data. The encryption/decryption circuit 1240 may decrypt the message data from the final ciphertext CT' by referring to the encryption parameters PRMT including the total length of the ciphertext, the guard interval GI size, the length of the message, or the length of the error.

As described above, the homomorphic encryption device 1200 can perform encryption and decryption using the noise prediction value Naprx provided from the noise predictor 1140 rather than the operation information of the system.

Figure 6:
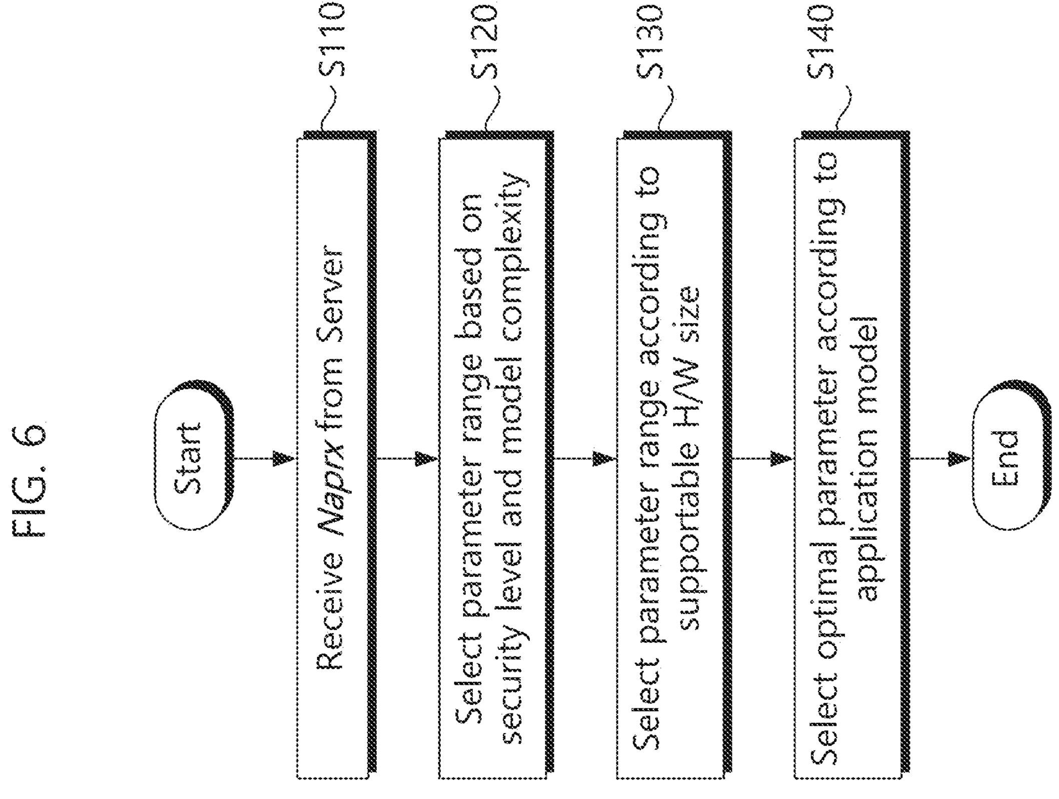
FIG. 6 is a flowchart showing an example of a method of configuring a parameter mapping table using a noise prediction value according to some implementations.

FIG. 6 is a flowchart showing an example of a method of configuring a parameter mapping table using the noise prediction value Naprx according to some implementations. In FIG. 6, the parameter generation circuit 1222 (see FIG. 5) generates encryption parameters PRMT according to the noise prediction value Naprx generated from the noise predictor 1140 of the homomorphic encryption operation device 1100 (see FIG. 1) and the requirements of the homomorphic encryption system.

In step S110, the parameter generation circuit 1222 receives the noise prediction value Naprx generated from the noise predictor 1140. The homomorphic encryption operation device 1100 may be implemented as a server in the homomorphic encryption system 1000.

In step S120, the parameter generation circuit 1222 may determine the approximate range of the guard interval GI according to constraints that can achieve the security level required by the homomorphic encryption standard. Here, the security level refers to the number of calculations or number of bits that are likely to result in the password being unlocked in response to a hacker's attack. Accordingly, a range of allowable parameters depending on the security level is provided in the homomorphic encryption standard.

In step S130, the parameter generation circuit 1222 determines a parameter range that can be supported by various hardware resources included in the homomorphic encryption operator 1120 of the homomorphic encryption device 1200. For example, the size of the selectable guard interval GI may vary depending on the type, size, number, or processing capability of functional blocks IPs provided by the encryption/decryption circuit 1240.

In step S140, the parameter generation circuit 1222 may select the guard interval GI required for the application model of the homomorphic cryptographic operator 1120 included in the homomorphic encryption operation device 1100 within the range determined in step S130. For example, if the operation applied in the homomorphic encryption operation device 1100 corresponds to homomorphic encryption-based machine learning ML, several functions running inside the homomorphic encryption operation device 1100 for the operation can be implemented in the form of an approximate polynomial. Accordingly, the more approximation is made with a higher-degree polynomial, the higher the approximation accuracy is, and the overall accuracy of machine learning ML also increases. However, as the order increases, the required guard interval GI also increases. Accordingly, the parameter generation circuit 1222 can select the optimal guard interval GI required by the application model used in the calculation of the homomorphic encryption within the range determined in step S130.

The above steps have been described as procedures for generating the noise prediction value Naprx generated from the noise predictor 1140 and the encryption parameter PRMT according to the requirements of the homomorphic encryption system 1000. However, the order of the above-described procedures is only exemplary, and the advantages of the present invention are not limited to the above-described order.

Figure 7:
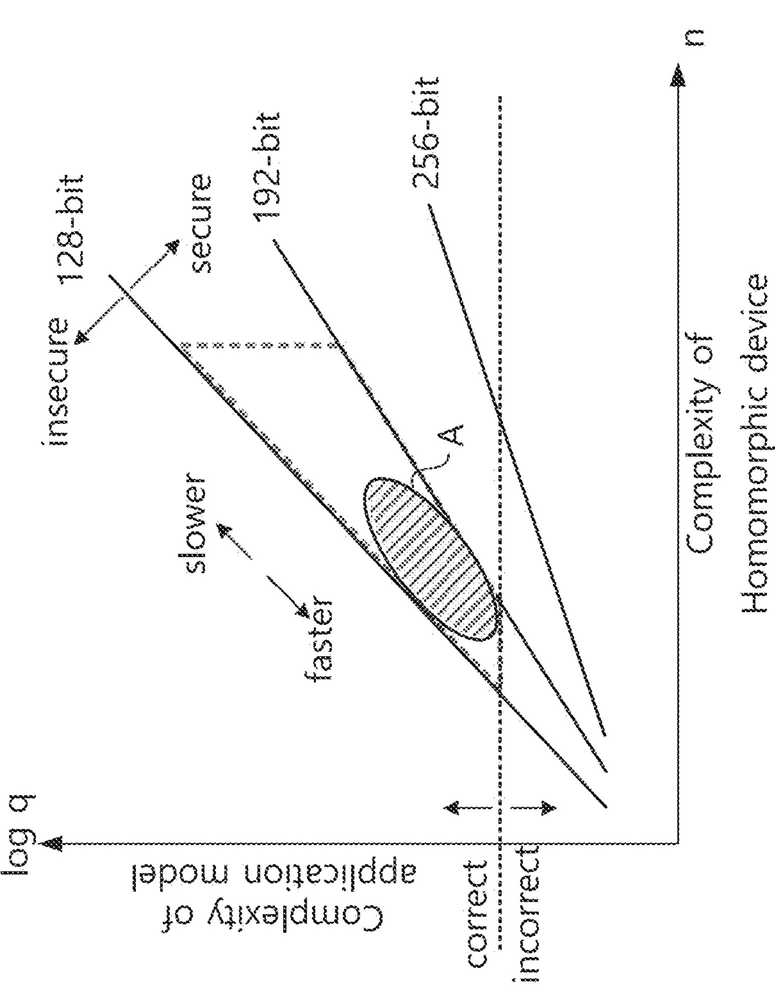
FIG. 7 is a graph illustrating examples of constraints that can achieve the security level required by the homomorphic encryption standard described in step S120 of FIG. 6 according to some implementations.

FIG. 7 is a graph illustrating examples of constraints that can achieve the security level required by the homomorphic encryption standard described in step S120 of FIG. 6 according to some implementations. In FIG. 7, the horizontal axis represents the complexity of the homomorphic encryption device 1200 or the user device, and the vertical axis represents the complexity of the application model operated in the server or the homomorphic encryption operation device 1100.

The parameter generation circuit 1222 may determine a security level that can maintain security based on the complexity of the homomorphic encryption operation device 1100 and the homomorphic encryption device 1200. For example, if the complexity of the homomorphic encryption operation device 1100 and the homomorphic encryption device 1200 is included in the hatched area range (area A), a security level required to satisfy both error performance and security may be selected as 128-bit. In addition, the range of allowable parameters depending on the selected security level can be determined in the homomorphic encryption standard.

FIG. 8 is a table illustrating an example of an upper limit size of the guard interval GI according to the functional block IP size of the homomorphic encryption device according to some implementations. In FIG. 8, the parameter generation circuit 1222 may determine the size of the guard interval GI according to the type, size, number, or processing capacity of the FPGA (Field-Programmable Gate Array) and functional blocks IPs included in the encryption/decryption circuit 1240.

When the first FPGA FPGA1 is used in the homomorphic encryption device 1200 and the homomorphic encryption function blocks HE IP are used, the upper limit of the supportable guard interval GI may be set to 40. The first FPGA FPGA1 can be provided with 1100K, 2500K, 10 MB, and 7000 lookup tables LUT, flip-flop FF, block RAM BRAM, and digital signal processor DSP for calculation, respectively. To configure the homomorphic encryption function block HE IP, the lookup table LUT, flip-flop FF, block RAM BRAM, and digital signal processor DSP may be provided in 800K, 800K, 9.5 MB, and 5000, respectively. Accordingly, the upper limit of the size of the guard interval GI may be selected as 40.

In some implementations, when the second FPGA FPGA2 is used in the homomorphic encryption device 1200 and the homomorphic encryption function blocks HE IP are used, the upper limit of the supportable guard interval GI may be set to 20. The second FPGA FPGA2 will be provided with 800K, 450K, 4.3 MB, and 1900 lookup tables LUT, flip-flop FF, block RAM BRAM, and digital signal processor DSP for calculation, respectively. To configure the homomorphic encryption function block HE IP, lookup table LUT, flip-flop FF, block RAM BRAM, and digital signal processor DSP are provided in quantities of 450K, 450K, 4 MB, and 1800, respectively. Accordingly, the upper limit of the size of the guard interval GI may be selected as 20.

FIG. 9 illustrates examples of generating various encryption parameters according to the range of the noise prediction value Naprx based on FIG. 7 according to some implementations, and FIG. 8 as an example of a parameter mapping table according to some implementations. In FIG. 9, when a noise prediction value Naprx is given, encryption parameters PRMT such as guard interval GI, polynomial order, security level, size of ciphertext, etc. may be provided from the parameter mapping table 1225.

When the noise prediction value Naprx generated by the noise predictor 1140 is received, the parameter generation circuit 1222 may select the encryption parameter PMRT corresponding to the noise prediction value Naprx from the parameter mapping table 1225. For example, when the received noise prediction value Naprx is '25', the parameter generation circuit 1222 sets the guard interval GI, polynomial order, security level, and ciphertext size to 40, 217, 256-bits, and 44 MB respectively. The selected parameters will be provided to the encryption/decryption circuit 1240 as encryption parameters PMRT.

Likewise, the parameter mapping table 1225 can provide the optimal guard interval GI, polynomial order, security level, and ciphertext size as encryption parameters PMRT for various noise prediction values Naprx.

Figure 10:
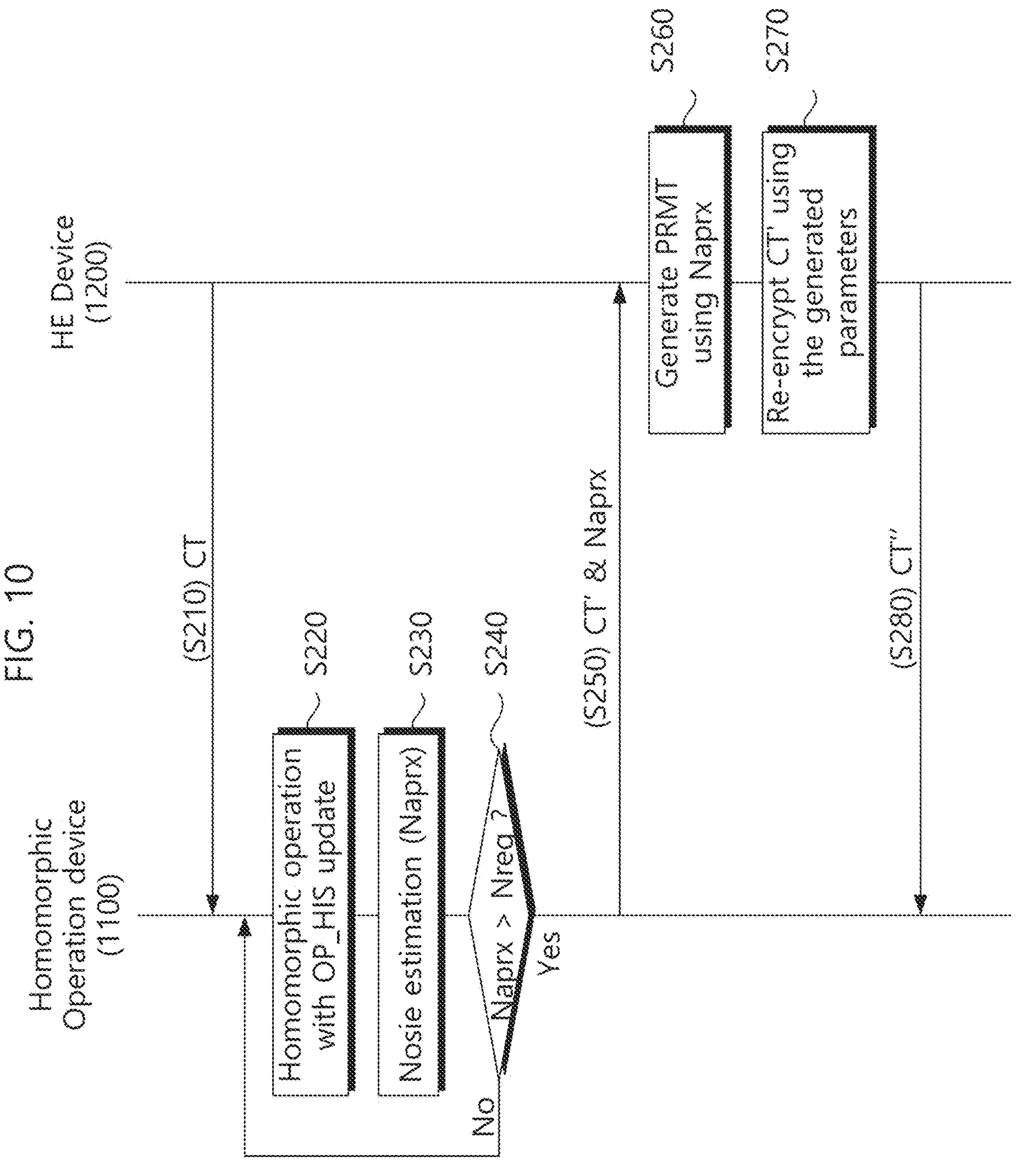
FIG. 10 shows an example of a procedure for generating a noise prediction value and generating and using the corresponding parameters performed in the homomorphic encryption system according to some implementations.

FIG. 10 shows examples of generation and use procedures of the noise prediction value Naprx and encryption parameters performed in the homomorphic encryption system according to some implementations. In FIG. 10, the homomorphic encryption operation device 1100 and the homomorphic encryption device 1200 can exchange ciphertext CT and noise prediction value Naprx.

In step S210, the ciphertext CT generated in the homomorphic encryption device 1200 is transmitted to the homomorphic encryption operation device 1100. For example, this may be the case where the homomorphic encryption device 1200 requests the homomorphic encryption operation device 1100 to perform an operation such as machine learning on the ciphertext CT.

In step S220, the homomorphic encryption operation device 1100 performs homomorphic encryption operations on the received ciphertext CT. Accordingly, history information OP_HIS such as the type or number of operations on the ciphertext CT is generated. In some implementations, history information OP_HIS can be added to the ciphertext CT in the form of a tag and updated. For example, history information OP_HIS may be the number of multiplications or additions between ciphertext and ciphertext, or the number of multiplications or additions between ciphertext and plaintext. In some implementations, history information OP_HIS may include information about the types and number of various operations applied to the ciphertext. As the operation is repeated, the number of multiplications or additions recorded in the history information OP_HIS can be updated in an accumulated form.

In step S230, the noise predictor 1140 (see FIG. 1) generates a noise prediction value Naprx corresponding to the type or number of operations recorded in the history information OP_HIS. For example, the types of operations described in the history information OP_HIS may include a multiplication operation between ciphertexts, binary tree multiplication of ciphertexts, and binary tree addition of ciphertexts. In this way, the noise predictor 1140 can generate a noise prediction value Naprx corresponding to various types of operations recorded in the history information OP_HIS. The noise prediction value Naprx is information about the size of noise generated by the following calculation.

In step S240, the homomorphic encryption operator 1120 checks whether the noise prediction value Naprx generated in step S230 exceeds the reference value Nreq. If the noise prediction value Naprx does not exceed the reference value Nreq ('No' direction), the procedure returns to step S220 and continues calculating the ciphertext. Additionally, if the noise prediction value Naprx exceeds the reference value Nreq ('Yes' direction), the procedure moves to step S250.

In step S250, the homomorphic encryption operation device 1100 stops further ciphertext operations and transmits the stopped operation intermediate value CT' and the noise prediction value Naprx to the homomorphic encryption device 1200.

In step S260, the homomorphic encryption device 1200 receives the operation intermediate value CT' and the noise prediction value Naprx transmitted from the homomorphic encryption operation device 1100. Then, the noise prediction value Naprx is used to generate an encryption parameter PMRT to be used in the encryption or decryption operation of the homomorphic encryption device 1200. For example, the homomorphic encryption device 1200 can configure the parameter mapping table 1225 using the noise prediction value Naprx.

In step S270, the homomorphic encryption device 1200 re-encrypts the operation intermediate value CT' received after stopping the calculation from the homomorphic encryption operation device 1100. For example, the homomorphic encryption device 1200 generates a ciphertext CT" by encrypting the operation intermediate value CT' using the encryption parameter PMRT provided by the parameter mapping table 1225.

In step S280, the homomorphic encryption device 1200 transmits the ciphertext CT" generated by the re-encryption operation to the homomorphic encryption operation device 1100 for additional calculation.

As described above, the operations of the homomorphic encryption operation device 1100 generates the noise predicted value Naprx rather than the operation information and the homomorphic encryption device 1200 generates the encryption parameter PMRT from the noise predicted value Naprx. By using the noise prediction value Naprx, the homomorphic encryption operation device 1100 and the homomorphic encryption device 1200 can perform encryption or ciphertext operation without exchanging operation information used in the homomorphic encryption system 1000.

FIG. 11 is a diagram showing examples of effects in a system using the noise prediction value Naprx according to some implementations. In FIG. 11, a case where noise prediction is not used CASE1 and a case where noise prediction is used CASE2 are shown, respectively.

First, in the case where noise prediction is not used CASE1, original data DT represents plaintext data before encryption. The original data DT is encrypted into the first ciphertext CT1 by the homomorphic encryption device 1200. In encryption, noise is inserted for security. By inserting a guard interval GI, message loss due to noise can be prevented when an encryption operation occurs.

The first ciphertext CT1 is delivered to the homomorphic encryption operation device 1100, and the homomorphic encryption operation device 1100 will perform operations, such as multiplication or addition, on the first ciphertext CT1. The first ciphertext CT1 is converted into the second ciphertext CT2 by the first operation OP1. The noise size of the second ciphertext CT2 increases due to the first operation OP1. Likewise, the second ciphertext CT2 is converted into the third ciphertext CT3 by the second operation OP2. Through the operation, the noise size of the second ciphertext CT2 increases. The third ciphertext CT3 is converted into the fourth ciphertext CT4 by the third operation OP3. In the fourth ciphertext CT4, the noise becomes too much and no more messages remain. Accordingly, even if the fourth ciphertext CT4 is decrypted, it is impossible to restore the message that existed in the original data DT, and decryption of the fourth ciphertext CT4 fails. However, if the server's operation information is not provided, decoding failure can be determined only when decryption is completed.

On the other hand, when using noise prediction CASE2, the stopping point of the operation can be monitored through the noise prediction value Naprx. The original data DT is encrypted into the first ciphertext CT1 by the homomorphic encryption device 1200. In cryptographic operations, noise is inserted for security. And a guard interval GI is also inserted.

The encrypted first ciphertext CT1 is delivered to the homomorphic encryption operation device 1100, and the homomorphic encryption operation device 1100 will perform a scheduled operation on the first ciphertext CT1. The first ciphertext CT1 may include history information OP_HIS in the form of a tag. The first ciphertext CT1 is converted into the second ciphertext CT2 by the first operation OP1. Accordingly, the noise predictor 1140 (see FIG. 1) uses the history information OP_HIS to generate a noise prediction value Naprx according to the number or type of operation used in the first operation OP1. In the same way, the noise prediction value Naprx can be generated in the second operation OP2. If it is determined that the noise prediction value Naprx generated in the second operation OP2 exceeds the reference value Nreq or the reserved guard interval GI is exhausted, the homomorphic encryption operation device 1100 stops additional operations. Then, the operation intermediate value CT' and the noise prediction value Naprx will be transmitted to the homomorphic encryption device 1200. Accordingly, the homomorphic encryption device 1200 generates an encryption parameter PRMT using the received noise prediction value Naprx, and the homomorphic encryption device 1200 can decrypt the operation intermediate value CT' based on the generated encryption parameter PRMT.

Through noise prediction, the size of noise in ciphertext operations can be predicted. In addition, by using the noise prediction value, encryption or decryption of ciphertext is possible even in situations where operation information does not exist.

FIG. 12 is a block diagram showing an example of a homomorphic encryption system according to some implementations. In FIG. 12, the homomorphic encryption system 2000 may include a homomorphic encryption operation device 2100 and a homomorphic encryption device 2200. For example, the homomorphic encryption device 2200 can process ciphertext operations that were not completed in the homomorphic encryption operation device 2100. That is, the homomorphic encryption device 2200 can receive the suspended operation ciphertext CT_interm and the remaining operation information OP_remained to complete the operation that was not completed in the homomorphic encryption device 2100.

The homomorphic encryption operation device 2100 performs operations on ciphertexts CT transmitted from the homomorphic encryption device 2200. The homomorphic encryption operation device 2100 may be a server. The homomorphic encryption operation device 2100 performs an operation on the ciphertext CT transmitted from the homomorphic encryption device 2200. Noise is inserted into the ciphertext CT of homomorphic encryption for security purposes. As calculations are performed, noise increases in the data. If noise increases more than appropriate as the number of operations increases, decoding may become impossible. Accordingly, the ciphertext CT of the homomorphic encryption includes a guard interval GI when generating the ciphertext to prevent noise from affecting the original data due to operations between ciphertexts.

The homomorphic encryption operation device 2100 can generate a noise prediction value Naprx so that the homomorphic encryption device 2200 can set an appropriate guard interval GI and perform encryption/decryption without transmitting operation information. For this purpose, the homomorphic cryptographic operation device 2100 includes a homomorphic cryptographic operator 2120 and a noise predictor 2140. The homomorphic encryption operator 2120 performs various operations on the ciphertext CT provided by the homomorphic encryption device 2200. Whenever each operation occurs, the homomorphic encryption operator 2120 generates history information OP_HIS. Accordingly, history information OP_HIS can be added and updated in the form of a tag to the ciphertext CT generated as a result of the operation.

The noise predictor 2140 predicts the noise accumulated by the operation of the ciphertext from the history information OP_HIS provided by the homomorphic encryption operator 2120. The noise predictor 2140 may check the size of the noise prediction value Naprx and determine when to stop the operation. If the noise prediction value Naprx corresponds to the point at which the operation is stopped, the operation of the ciphertext can be stopped. The noise predictor 2140 transmits the suspended operation ciphertext CT_interm and the remaining operation information OP_remained from the aborted operation to the homomorphic encryption device 2200. Here, the remaining operation information OP_remained refers to information about the remaining operation that the homomorphic encryption operator 2120 failed to perform on the ciphertext CT.

The homomorphic encryption device 2200 converts plaintext into ciphertext or converts ciphertext into plaintext using a homomorphic encryption algorithm. The homomorphic encryption device 2200 may be a user device. For example, the homomorphic encryption device 2200 receives the suspended operation ciphertext CT_interm and the remaining operation information OP_remained from the homomorphic encryption operation device 2100 and continues the operation stopped in the homomorphic encryption operation device 2100. In addition, the homomorphic encryption device 2200 can use the noise prediction value Naprx to obtain a guard interval GI for encryption without operation information.

The homomorphic encryption device 2200 generates an encryption parameter PRMT from the noise prediction value Naprx provided from the homomorphic encryption operation device 2100. Additionally, the homomorphic encryption device 2200 can obtain the optimal guard interval GI using the encryption parameter PRMT and generate ciphertext. Accordingly, the homomorphic encryption device 2200 may include a homomorphic encryption parameter generator 2220 and an encryption/decryption circuit 2240.

In particular, the homomorphic encryption device 2200 can continue to perform the encryption operation that was stopped in the homomorphic encryption device 2100 using the suspended operation ciphertext CT_interm and the remaining operation information OP_remained. For example, the homomorphic encryption device 2200 can continue the operation that was stopped in an incomplete state by the homomorphic encryption operation device 2100. For this purpose, the homomorphic encryption device 2200 can use the suspended operation ciphertext CT_interm and the remaining operation information OP_remained.

Additionally, the homomorphic encryption parameter generator 2220 may obtain a guard interval GI that satisfies at least one condition from the noise prediction value Naprx provided from the homomorphic encryption operation device 2100. For example, the conditions may include constraints that meet the security of the homomorphic encryption standard, the size or capability of the functional block IP of the homomorphic encryption device 2200, or application model requirements. The homomorphic encryption parameter generator 1220 can construct a parameter mapping table from the noise prediction value Naprx and provide a guard interval GI at high speed.

The encryption/decryption circuit 2240 uses parameters (e.g., guard interval) provided from the homomorphic encryption parameter generator 2220 for encryption and decryption operations. For example, the encryption/decryption circuit 2240 may generate ciphertext using an optimized guard interval GI provided from the homomorphic encryption parameter generator 2220 during encryption. In this case, the optimal guard interval GI for encryption can be generated without operation information of the homomorphic encryption operator 2100 implemented as a server. Accordingly, encryption or decryption is possible using parameters such as guard interval GI optimized for the homomorphic encryption system 2000.

In some implementations, the homomorphic encryption system 2000 can obtain optimal parameters applied to encryption by using the noise prediction value Naprx generated from the noise predictor 2140 instead of operation information. For example, the size of the optimal guard interval GI used for encryption of homomorphic encryption can be generated from the noise prediction value Naprx. In addition, the homomorphic encryption device 2200 can complete the encryption operation stopped in the homomorphic encryption operation device 2100 using the suspended operation ciphertext CT_interm and the remaining operation information OP_remained from the homomorphic encryption operation device 2100. there is.

Figure 13:
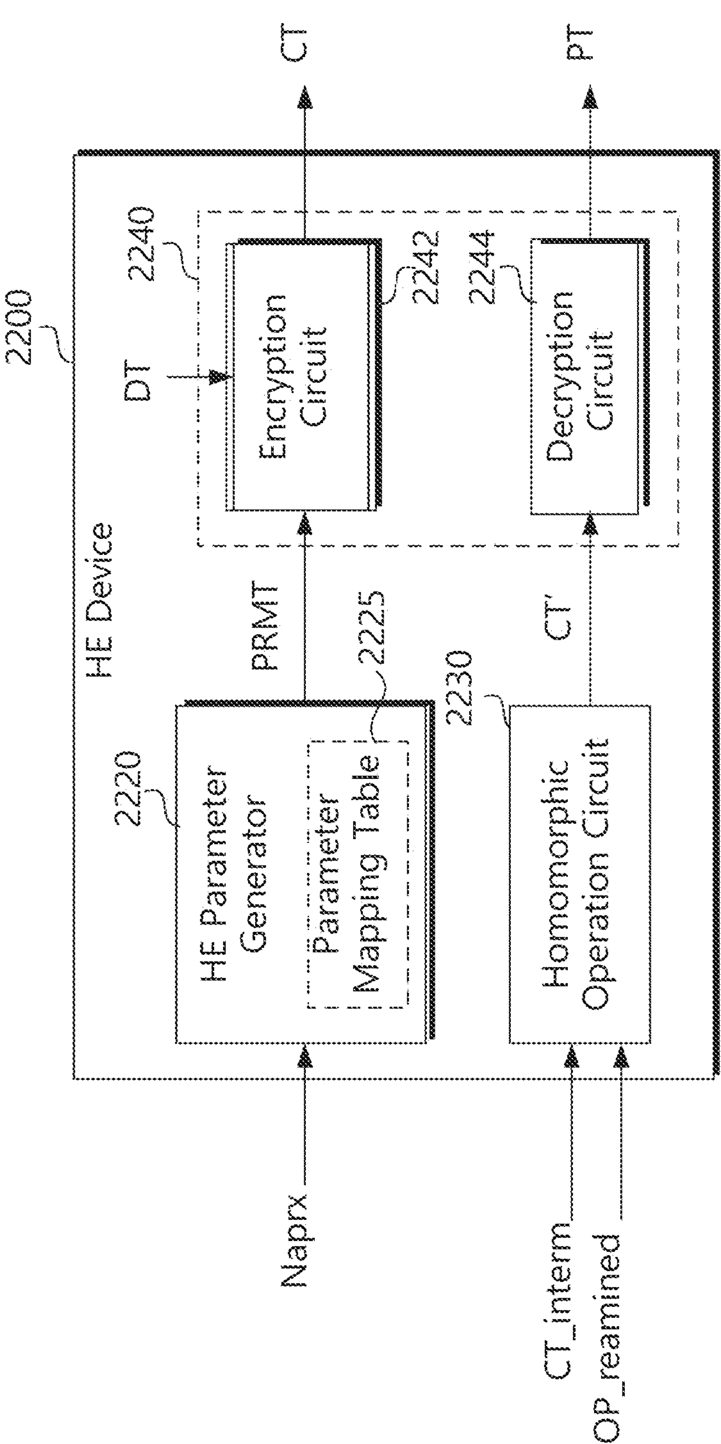
FIG. 13 is a block diagram showing an example of a configuration of the homomorphic encryption device of FIG. 12 according to some implementations.

FIG. 13 is a block diagram showing an example of a configuration of the homomorphic encryption device of FIG. 12 in more detail according to some implementations. In FIG. 13, the homomorphic encryption device 2200 may include a homomorphic encryption parameter generator 2220, a homomorphic encryption operation circuit 2230, and an encryption/decryption circuit 2240.

The homomorphic encryption parameter generator 2220 receives the noise prediction value Naprx provided by the noise predictor 2140. Additionally, the homomorphic encryption parameter generator 2220 may generate a parameter mapping table 2225 with reference to the received noise prediction value Naprx and the constraints of the homomorphic encryption system 2000. Constraints of the homomorphic encryption system 2000 may include, for example, the security level of the homomorphic encryption system 2000, the guard interval GI size that can be supported by the homomorphic encryption function block IP, and guard intervals GI required for running the application model (e.g., machine learning).

The homomorphic encryption operation circuit 2230 processes and completes the encryption operation stopped in the homomorphic encryption operation unit 2100 using the suspended operation ciphertext CT_interm and the remaining operation information OP_remained transmitted from the homomorphic encryption operation unit 2100. The homomorphic encryption operation circuit 2230 completes the operation using the suspended operation ciphertext CT_interm and the remaining operation information OP_remained, generates a completion ciphertext CT' as a result, and transmits it to the decryption circuit 2244.

The encryption/decryption circuit 2240 may include an encryption circuit 2242 and a decryption circuit 2244. The encryption circuit 2242 may encrypt the data DT using the encryption parameters PRMT provided by the homomorphic encryption parameter generator 2220. The encryption circuit 2242 may receive data DT from the outside and generate ciphertext CT by homomorphically encrypting the data DT according to the encryption parameters PRMT provided from the parameter generation circuit 1222. For example, the encryption circuit 2242 can generate a ciphertext CT that satisfies the encryption parameters (PRMT), that is, the total length of the ciphertext, the guard interval GI size, the length of the message, or the length of the error.

The decryption circuit 2244 may receive the final ciphertext CT' generated through completion of the remaining calculation from the homomorphic encryption operation circuit 2230, decrypt it, and output the decrypted data PT. The decryption circuit 2244 decrypts the data PT from the final ciphertext CT' by referring to the encryption parameters PRMT, that is, the total length of the ciphertext, the guard interval GI size, the length of the message, or the length of the error.

As described above, the homomorphic encryption device 2200 can perform encryption and decryption using the noise prediction value Naprx provided from the noise predictor 2140 rather than the operation information of the system. In addition, the homomorphic encryption device 2200 can complete the suspended encryption operation using the suspended operation ciphertext CT_interm and the remaining operation information OP_remained transmitted from the homomorphic encryption operation device 2100.

Figure 14:
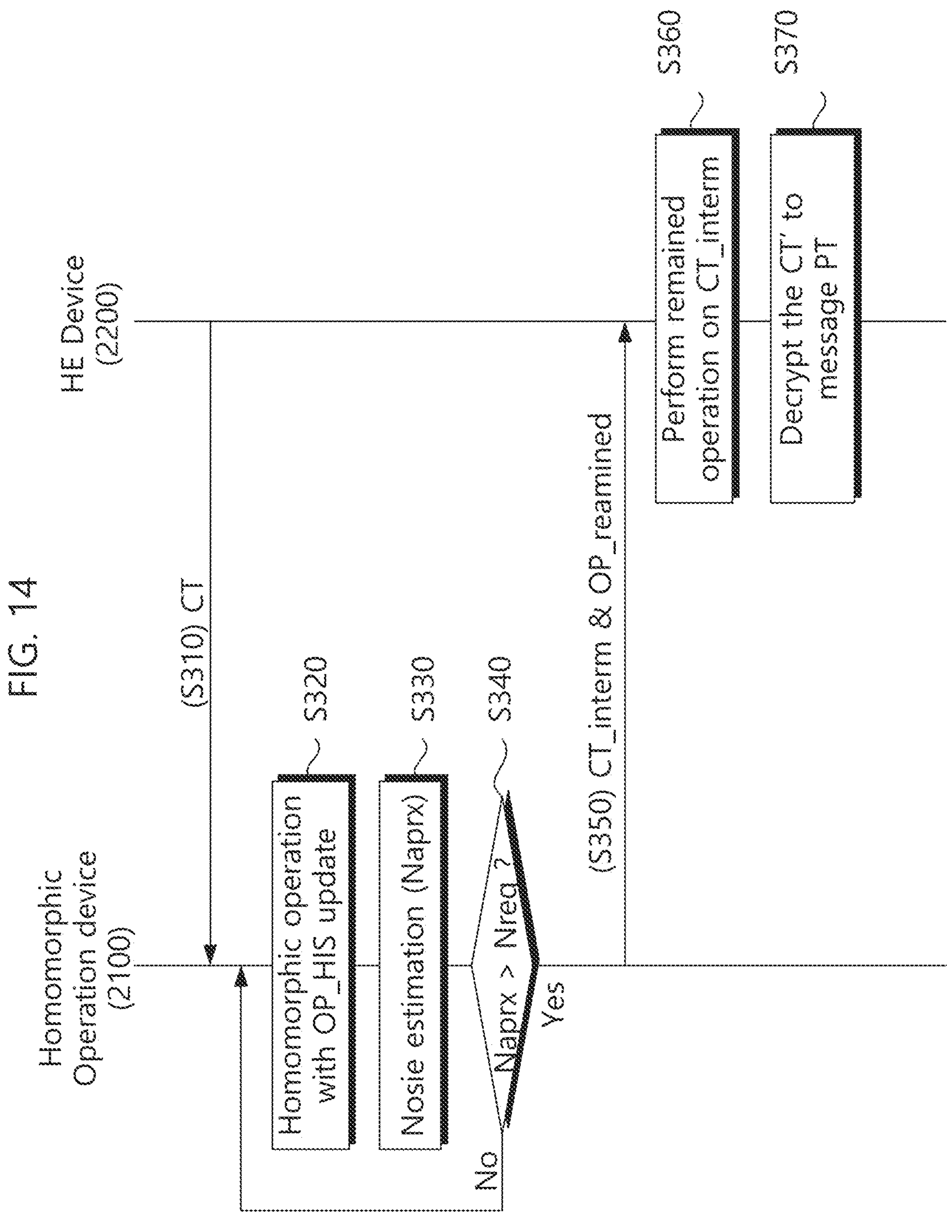
FIG. 14 shows an example of generation of the noise prediction value performed in the homomorphic encryption system according to some implementations and an example of a calculation method using the stopping operation ciphertext CT_interm and remaining operation information OP_remained in the homomorphic encryption device according to some implementations.

FIG. 14 shows an example of generation of the noise prediction value Naprx performed in the homomorphic encryption system according to some implementations and an example of a calculation method using the suspended operation ciphertext CT_interm and remaining operation information OP_remained in the homomorphic encryption device according to some implementations. In FIG. 14, the homomorphic encryption operation device 2100 and the homomorphic encryption device 2200 may exchange noise prediction value Naprx, suspended operation ciphertext CT_interm, and remaining operation information OP_remained.

In step S310, the ciphertext CT generated by the homomorphic encryption device 2200 is transmitted to the homomorphic encryption operation device 2100.

In step S320, the homomorphic encryption operation device 2100 performs homomorphic encryption operations on the received ciphertext CT. Accordingly, history information OP_HIS, such as the type or number of operations on the ciphertext CT, is generated. History information OP_HIS can be added to the ciphertext CT in the form of a tag and updated. As the operation is repeated, the number of multiplications or additions recorded in the history information OP_HIS may be updated in an accumulated form.

In step S330, the noise predictor 2140 (see FIG. 12) generates a noise prediction value Naprx corresponding to the type or number of operations recorded in the history information OP_HIS. Accordingly, the noise predictor 2140 can generate a noise prediction value Naprx corresponding to various types of operations recorded in the history information OP_HIS. The noise prediction value Naprx is estimated information about the size of noise generated by subsequent operations.

In step S340, the homomorphic encryption operator 2120 checks whether the noise prediction value Naprx generated in step S330 exceeds the reference value Nreq. If the noise prediction value Naprx does not exceed the reference value Nreq ('No' direction), the procedure returns to step S320 and continues calculating the ciphertext. If the noise prediction value Naprx exceeds the reference value Nreq ('Yes' direction), the procedure moves to step S350.

In step S350, the homomorphic encryption operation device 2100 stops further ciphertext operations and transmits the suspended operation ciphertext CT_interm, noise prediction value Naprx, and remaining operation information OP_remained to the homomorphic encryption device 2200.

In step S360, the homomorphic encryption device 2200 receives the suspended operation ciphertext CT_interm, the noise prediction value Naprx, and the remaining operation information OP_remained transmitted from the homomorphic encryption operation device 2100. Then, the noise prediction value Naprx is used to generate an encryption parameter PMRT to be used in the encryption or decryption operation of the homomorphic encryption device 2200. Additionally, the homomorphic encryption device 2200 can process and complete the suspended encryption operation using the suspended operation ciphertext CT_interm and the remaining operation information OP_remained transmitted from the homomorphic encryption operation device 2100. The homomorphic encryption operation circuit 2230 may complete the operation using the suspended operation ciphertext CT_interm and the remaining operation information OP_remained, and generate a final ciphertext CT' as a result.

In step S370, the homomorphic encryption device 1200 may receive the final ciphertext CT', decrypt it, and output the decrypted data PT.

As described above, the homomorphic encryption device 2200 can perform encryption and decryption using the noise prediction value Naprx provided from the noise predictor 2140 rather than the operation information of the system. In addition, the homomorphic encryption device 2200 can complete the suspended encryption operation using the suspended operation ciphertext CT_interm and the remaining operation information OP_remained transmitted from the homomorphic encryption operation device 2100.

Figure 15:
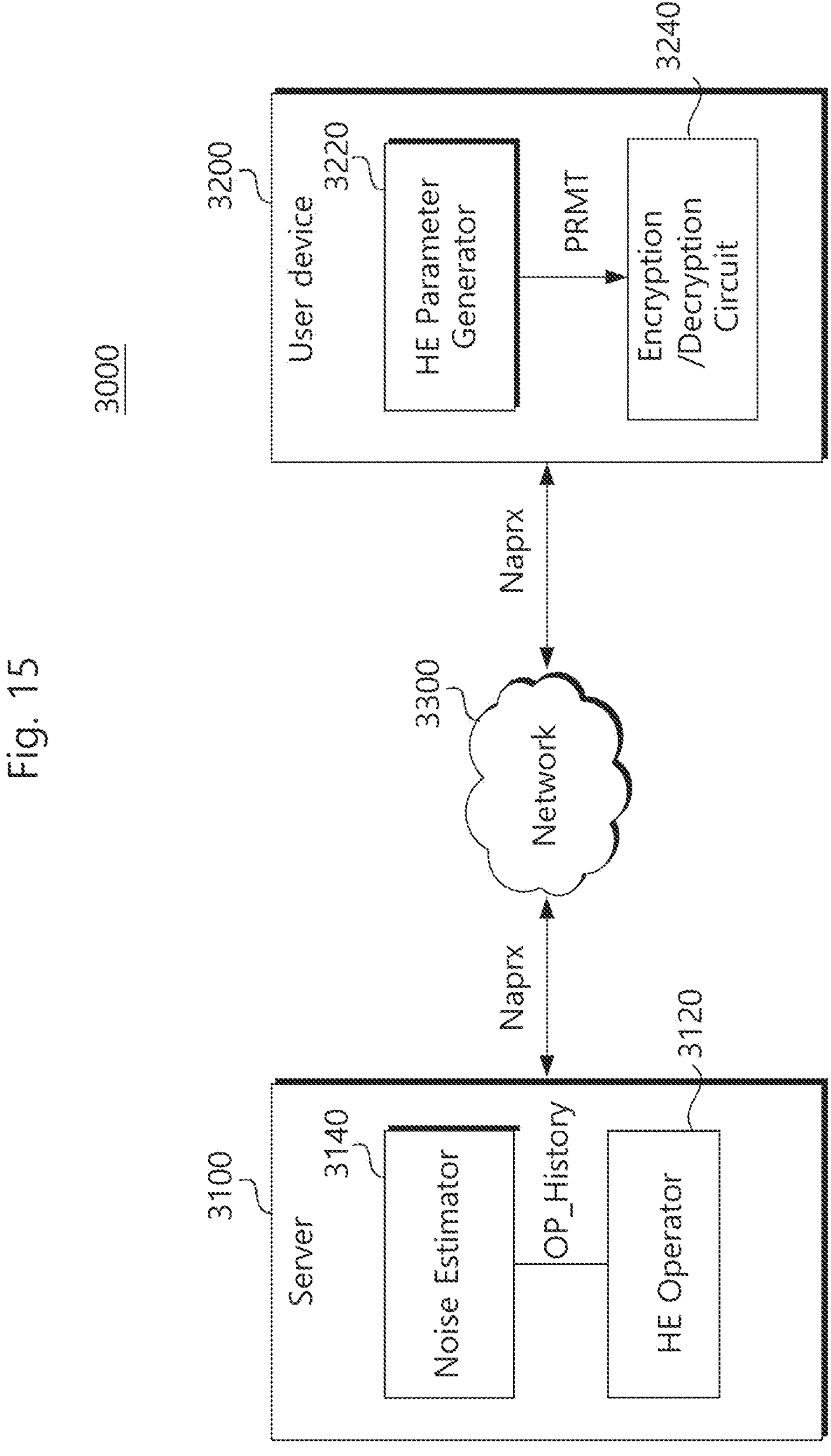
FIG. 15 is a block diagram showing an example of a homomorphic encryption system according to some implementations.

FIG. 15 is a block diagram showing an example of a homomorphic encryption system 3000 according to some implementations. In FIG. 15, the homomorphic encryption system 3000 may include a server 3100, a user device 3200, and a network 3300. For example, the server 3100 may operate substantially the same as the homomorphic encryption operation device 1100 of FIG. 1 or the homomorphism encryption operation device 2100 of FIG. 12. The user device 3200 may operate substantially the same as the homomorphic encryption device 1200 of FIG. 1 or the homomorphic encryption device 2200 of FIG. 12.

The server 3100 performs operations on ciphertexts CTs transmitted from the user device 3200. The server 3100 may provide cloud services or ultra-low latency services using distributed computing or mobile edge computing. In particular, the server may be an intelligent server that performs calculations on ciphertext CT using machine learning or neural networks.

The server 3100 provides a noise prediction value Naprx so that the user device 3200 can set an optimal guard interval GI and perform encryption/decryption without operation information. For this purpose, the server 3100 includes a homomorphic encryption operator 3120 and a noise predictor 3140. The homomorphic encryption operator 3120 performs various operations on the ciphertext CT provided by the user device 3200. Whenever each operation occurs, the homomorphic encryption operator 3120 generates history information OP_HIS. Accordingly, history information OP_HIS can be added and updated in the form of a tag to the ciphertext CT generated as a result of the operation.

The noise predictor 3140 predicts the noise accumulated by the operation of the ciphertext from the history information OP_HIS provided by the homomorphic encryption operator 3120. Based on the noise prediction value Naprx, the noise predictor 3140 transmits the calculated intermediate value CT' and the noise prediction value Naprx to the user device 3200.

The user device 3200 converts plaintext into ciphertext or converts ciphertext into plaintext using a homomorphic encryption algorithm. For example, the user device 3200 can calculate the optimal guard interval GI size for encryption without operation information from the server 3100. An encryption parameter PRMT is generated from the noise prediction value Naprx provided from the server 3100. Additionally, the user device 3200 can obtain the optimal guard interval GI using the encryption parameter PRMT and generate ciphertext. Accordingly, the user device 3200 may include a homomorphic encryption parameter generator 3220 and an encryption/decryption circuit 3240.

In some implementations, the homomorphic encryption parameter generator 3220 may obtain the guard interval GI that satisfies at least one condition from the noise prediction value Naprx provided from the server 3100. For example, the conditions may include constraints that meet the security of the homomorphic encryption standard, the size or capability of the functional block IP of the user device 3200, or application model requirements. The homomorphic encryption parameter generator 3220 can construct a parameter mapping table from the noise prediction value Naprx and provide the guard interval GI at high speed.

In some implementations, the encryption/decryption circuit 3240 uses parameters (e.g., guard interval) provided from the homomorphic encryption parameter generator 3220 for encryption and decryption operations. For example, the encryption/decryption circuit 3240 may generate ciphertext using an optimized guard interval GI provided from the homomorphic encryption parameter generator 3220 during encryption. Accordingly, the optimal guard interval GI for encryption can be generated even without operation information provided from the server 3100. Additionally, encryption or decryption is possible using parameters, such as the guard interval GI optimized for the homomorphic encryption system 3000.

The network 3300 may be an Ethernet communication network. The server 3100 and the user device 3200 may be connected to the network 3300 through an Ethernet switch. However, the network 3300 may be one of any wired/wireless networks such as LAN (Local Area Network), WAN (Wide Area Network), Wi-Fi, etc.

In some implementations, the homomorphic encryption system 3000 can obtain optimal parameters applied to encryption by using the noise prediction value Naprx generated from the noise predictor 3140 instead of operation information. For example, the size of the optimal guard interval GI used for encryption of homomorphic encryption can be generated from the noise prediction value Naprx. Accordingly, the optimal guard interval GI required for encryption can be easily generated without the server's operation information.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

What is claimed is:

1. A method of operating a homomorphic encryption system, comprising:

generating a ciphertext;

performing an operation on the ciphertext, to obtain an operation intermediate value that comprises a modification of the ciphertext;

generating history information about the operation;

generating, using the history information, a cryptographic noise prediction value by predicting a size of cryptographic noise accumulated in the ciphertext by the operation, wherein the cryptographic noise comprises a value inserted into the ciphertext by the operation;

stopping the operation in response to the cryptographic noise prediction value exceeding a reference value;

transmitting the cryptographic noise prediction value and the operation intermediate value of the stopped operation to a user device;

generating, using the cryptographic noise prediction value, an encryption parameter including a guard interval; and performing, using the encryption parameter, homomorphic encryption on the operation intermediate value.

2. The method of claim 1, wherein generating the history information includes:

tagging the history information with a result of the operation on the ciphertext.

3. The method of claim 2, wherein the history information includes at least one of (1) a number of multiplications or additions between ciphertexts included in the operation, (2) a number of multiplications or additions between the ciphertext and a plaintext, (3) binary tree multiplication of the ciphertext, or (4) binary tree addition.

4. The method of claim 1, wherein the homomorphic encryption on the operation intermediate value generates a second ciphertext, and wherein the method comprises transmitting the second ciphertext from the user device.

5. The method of claim 1, comprising:

prior to the cryptographic noise prediction value exceeding the reference value, repeatedly:

(1) performing a homomorphic operation on a prior ciphertext result, (2) generating updated history information, and (3) generating an updated value for the cryptographic noise prediction value.

6. The method of claim 1, further comprising:

transmitting, to the user device, remaining operation information; and executing, by the user device, an operation subsequent to the stopping the operation using the remaining operation information.

7. The method of claim 6, wherein the user device includes an arithmetic circuit configured for the subsequent operation.

8. The method of claim 6, wherein generating the encryption parameter comprises:

selecting a first parameter range corresponding to a security level and hardware complexity of the homomorphic encryption system based on the cryptographic noise prediction value;

selecting a second parameter range corresponding to a capability or size of a homomorphic encryption functional block of the homomorphic encryption system based on the cryptographic noise prediction value; and determining the encryption parameter based on the first parameter range and the second parameter range.

9. A homomorphic encryption system, comprising:

a server configured to:

perform an operation on a first ciphertext, to obtain an operation intermediate value that comprises a modification of the first ciphertext, generate a cryptographic noise prediction value by estimating a size of cryptographic noise accumulated in the first ciphertext by the operation, wherein the cryptographic noise comprises a value inserted into the first ciphertext by the operation, stop the operation in response to the cryptographic noise prediction value exceeding a reference value, and transmit the cryptographic noise prediction value and the operation intermediate value to a user device; and the user device, wherein the user device is configured to:

generate, using the cryptographic noise prediction value, an encryption parameter including a guard interval, and perform homomorphic encryption on the operation intermediate value using the encryption parameter.

10. The system of claim 9, wherein the server comprises:

a homomorphic encryption operator configured to perform the operation on the first ciphertext and generate history information including characteristics of the operation; and a noise predictor configured to generate the cryptographic noise prediction value based on the history information.

11. The system of claim 10, wherein the history information is tagged with the first ciphertext.

12. The system of claim 10, wherein the history information includes at least one of a number of multiplications or additions included in the operation, a number of binary tree multiplications of the first ciphertext, or a number of binary tree additions.

13. The system of claim 9, wherein the homomorphic encryption on the operation intermediate value generates a second ciphertext, and wherein the user device is configured to transmit the second ciphertext to the server.

14. The system of claim 9, wherein the server is configured to transmit remaining operation information of the stopped operation to the user device, wherein the user device is configured to execute a subsequent operation of the stopped operation using the remaining operation information.

15. The system of claim 9, wherein the user device comprises:

a parameter generator configured to generate the encryption parameter, including the guard interval, based on the cryptographic noise prediction value; and an encryption/decryption circuit configured to perform the homomorphic encryption on the operation intermediate value.

16. A method of operating a homomorphic encryption system, comprising:

performing, by a server, an operation on a ciphertext, to obtain an operation intermediate value that comprises a modification of the ciphertext;

generating, by the server, history information about the operation;

generating, by the server, a cryptographic noise prediction value by predicting a size of cryptographic noise accumulated in the ciphertext by the operation using the history information, wherein the cryptographic noise comprises a value inserted into the ciphertext by the operation;

suspending the operation in response to the cryptographic noise prediction value exceeding a reference value;

transmitting, by the server, the cryptographic noise prediction value and the operation intermediate value to a user device; and generating, by the user device and using the cryptographic noise prediction value, encryption parameters including guard intervals for encryption; and performing, by the user device and using the encryption parameters, homomorphic encryption on the operation intermediate value.

17. The method of claim 16, wherein generating the history information includes:

tagging, by the server, the history information with an operation result of the ciphertext.

* * * * *